Nov. 25, 1969  A. FISCHBACH  3,479,695

INJECTION MOLDING MACHINE

Filed Dec. 29, 1966  2 Sheets-Sheet 1

INVENTOR:
Alfred FISCHBACH

BY
Michael S. Striker
his ATTORNEY

United States Patent Office 3,479,695
Patented Nov. 25, 1969

3,479,695
INJECTION MOLDING MACHINE
Alfred Fischbach, Am Scheffert, Ruenderoth,
Cologne, Germany
Filed Dec. 29, 1966, Ser. No. 605,898
Claims priority, application Germany, Jan. 7, 1966,
F 48,097
Int. Cl. B29f 1/00
U.S. Cl. 18—30         16 Claims

ABSTRACT OF THE DISCLOSURE

Injection molding machine wherein a mold section is mounted on a platen which is reciprocable along tie bars by a double-acting cylinder receiving hydraulic fluid from a variable delivery pump. The delivery of the pump is varied by a cycle control as a function of the position of the platen to vary the speed of the platen during forward and/or return movement.

CROSS-REFERENCE TO RELATED APPLICATIONS

Machines which can embody the cycle control of the present invention are disclosed in my copending applications Ser. Nos. 435,747 (filed Feb. 26, 1965 and entitled "Injection Moulding Apparatus"); 455,473 (filed May 13, 1965 and entitled "Locking Device for Injection Moulding Machine"); and 574,594 (filed Aug. 24, 1966 and entitled "Injection Molding Machine").

BACKGROUND OF THE INVENTION

The present invention relates to improvements in hydraulically operated injection molding machines for the production of shaped articles which preferably consist of synthetic thermoplastic material.

It is already known to provide an injection molding machine with one or more mold supporting platens which are reciprocable by a hydraulic unit including a pump, a double-acting cylinder and a differential piston in the cylinder. The movable platen or platens are caused to travel at a first speed while advancing in one direction and at a second speed during travel in the other direction. The cycle controls include valves which regulate the rate of fluid flow into the cylinder so that the speed of the movable platens is constant in each direction but the speed during travel in one direction may be different from the speed in the other direction. As a rule, the delivery of the pump is varied manually by changing the length of working strokes of the pump piston.

The operation of an injection molding machine can be improved considerably if the speed of the movable platen or platens can be varied during travel in the one and/or other direction. The quality of articles which consist of synthetic thermoplastic material is improved by proper selection of intervals taken up by the compression, cooling and other stages of the operating cycle, i.e., if the movable platens dwell in certain positions for preselected intervals of time and if the movement of platens in either direction is carried out at a greater, lesser and/or one or more intermediate speeds.

In injection molding machines wherein the platens are reciprocable by mechanical means, the cycle controls which can effect movements of platens at different speeds are extremely complicated, expensive and prone to malfunction. In many instances, the cycle controls simply start and arrest the platens during selected stages of the injection molding operation. Such on-and-off controls are unsatisfactory, mainly because the operating cycle consumes too much time and also because the mechanical elements undergo excessive wear. Furthermore, the presently known cycle controls which can effect forward and/or reverse movements of platens at different speeds cannot be utilized in injection molding machines wherein the platens are reciprocated by hydraulic means.

Accordingly, it is an important object of the present invention to provide a novel cycle control for hydraulically operated injection molding machines and to construct and assemble the cycle control in such a way that the forward and/or reverse speeds of one or more platens or analogous mold supports can be varied within any desired speed range and that the operating cycle can be completed within surprisingly short periods of time.

Another object of the invention is to provide a hydraulically operated injection molding machine which embodies the just outlined cycle control and wherein the elements of the cycle control occupy little room and are not prone to malfunction.

A further object of the invention is to provide a fully automatic cycle control and to provide means for overriding the automatic cycle control whenever necessary, for example, in the event of partial breakdown or when the machine is set up for a different operation.

An additional object of the invention is to provide a cycle control which comprises a small number of simple and rugged parts and which can be installed in many presently known injection molding machines without necessitating substantial alterations in the design and/or mode of operation of such machines.

A concomitant object of the invention is to provide a simple operative connection between the novel cycle control and the variable delivery pump of a hydraulically operated injection molding machine.

Still another object of the invention is to provide a cycle control which may be adjusted to select a different set of forward or reverse speeds for one or more movable mold supports of a hydraulically operated injection molding machine.

SUMMARY OF THE INVENTION

Briefly outlined, one feature of the present invention resides in the provision of an injection molding machine, particularly a machine for use in connection with shaping of synthetic thermoplastic articles. The machine comprises guide means preferably including a set of horizontal tie rods mounted in stationary parts of the machine frame, a mold support which includes at least one platen reciprocably mounted on the guide means and movable between a plurality of positions including two end positions, hydraulic reciprocating means for the mold support including variable delivery pump means, and cycle control means for regulating the delivery of the pump means and for thereby regulating the speed of the mold support as a function of the position of the mold support.

The reciprocating means preferably compreses a double-acting cylinder member and a piston member which is slidably received in the cylinder member. One of these members is fixed and the other member is connected with the mold support to reciprocate therewith in response to admission of pressure fluid from the pump means into the one or the other chamber of the double-acting cylinder member.

The cycle control means may comprise first and second cam means reciprocable with the mold support and motion transmitting means operatively connected with the pump means and including follower means for tracking one of the cam means during movement of the mold support in one direction and for tracking the other cam means during movement of the mold support in the other direction. The follower means preferably comprises a single roller follower which is displaceable in response to movement of the mold support to its end positions to be shifted from engagement with one cam means into engagement with the other cam means in one end position and from engagement with the other cam means into engagement with the one cam means in the other end position of the mold support. Such shifting can be effected by suitable electromagnets and limit switches which energize the electromagnets in corresponding end positions of the mold support.

The novel features which are considered as characteristic of the invention are set forth in particular in the appended claims. The improved injection molding machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
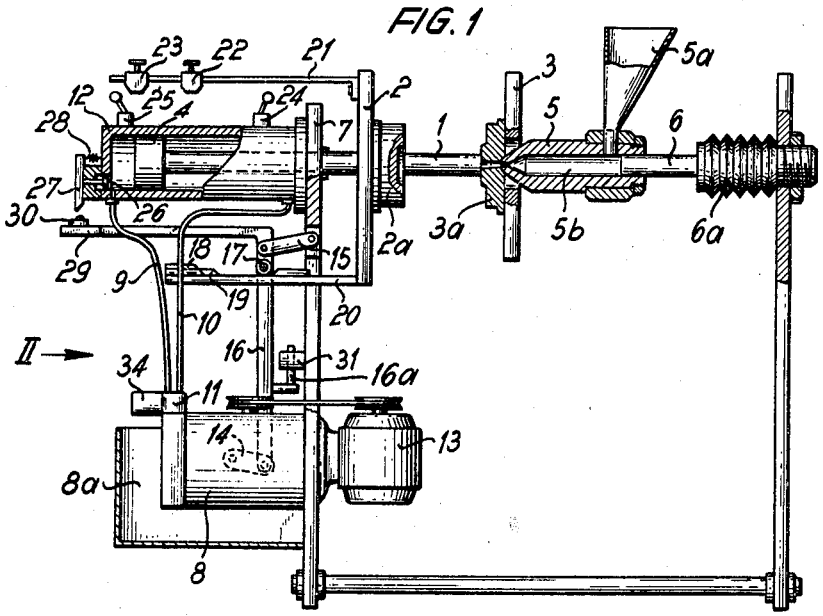
FIG. 1 is a schematic side elevational view of an injection molding machine which embodies one form of my invention, certain parts of the machine being shown in section.
Figure 2:
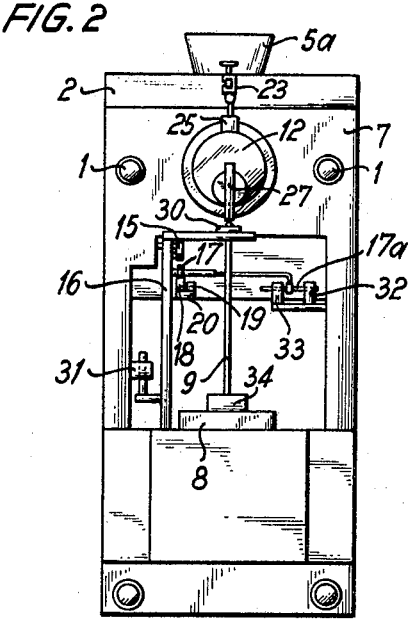
FIG. 2 is an end elevational view as seen in the direction of arrow A in FIG. 1.

Referring first to FIGS. 1 and 2, there is shown an injection molding machine which comprises a frame 7 including horizontal guide members in the form of tie bars 1 for two mold supports here shown as platens 2 and 3. These platens respectively carry female and male mold sections or mold halves 2a, 3a and are displaceable with as well as relative to each other between a plurality of different positions. The reciprocating means for the platens 2 and 3 comprises a horizontal double-acting hydraulic cylinder 12 which is fixed to the frame 7 and a differential piston 4 which is slidable in the cylinder 12 and is affixed to the platen 2. The reciprocating means also includes a variable delivery hydraulic pump 8 which can withdraw oil from or returns oil to a tank 8a and is connected with the chambers of the cylinder 12 by conduits 9 and 10. In order to close the mold, i.e., to move the female mold section 2a into abutment with the male mold section 3a, the conduit 9 admits oil into the left-hand chamber of the cylinder 12 so that such oil exerts pressure against the large left-hand end face of the piston 4 and causes the platen 2 to travel from its left-hand end position toward the platen 3. Upon completion of the closing stage, the conduit 9 continues to admit oil to the left-hand chamber of the cylinder 12 whereby the platens 2, 3 and the mold sections 2a, 3a advance as a unit and the platen 3 displaces a customary heating cylinder 5 with reference to a ram or injection plunger 6 so that the ram injects a charge of plasticized synthetic material into the cavity of the mold. The ram 6 is biased by a package of dished springs 6a.

In order to carry out a return stroke, the platens 2, 3 must be moved back in a direction to the left. This is caused by oil which is admitted through the conduit 10 and exerts pressure against the small right-hand end face of the piston 4. The piston 4 slides in the cylinder 12 and entrains the platen 2 together with the platen 3 which latter is temporarily coupled to the platen 2. The heating cylinder 5 also shares such movement and is displaced with reference to the ram 6 until its chamber 5b communicates with the outlet of a feeding device 5a which admits a fresh charge of granular material. The cylinder 5 and platen 3 are then arrested in the positions shown in FIG. 1, for example, by adjustable stop bolts which are not shown in the drawings. The piston 4 continues to advance toward the left-hand end of the cylinder 12 and entrains the platen 2 back to and beyond the intermediate position shown in FIG. 1. The frame 7 carries conventional knockout pins or ejector pins (not shown) which eject the finished article from the female mold section 2a in automatic response to return movement of the platen 2 to its left-hand end position.

The flow of oil from the pressure side of the pump 8 to the two chambers of the cylinder 12 and from such chambers back into the tank 8a is regulated by a four-way valve or distributor valve 11 which is controlled by an electromagnet 34. The prime mover for the pump 8 is constituted by an electric motor 13.

The cycle control of the injection molding machine includes a motion transmitting linkage 14–17 which can change the delivery of the pump 8 as a function of the position of the platen 2. The linkage comprises a first link 14 which is directly connected with and can change the stroke of the piston in the pump 8, a connecting rod 16 coupling the link 14 with a second link 15 which is articulately connected to the frame 7, and a single roller follower 17 which is supported by the connecting rod 16 and is movable back and forth in directions at right angles to the plane of FIG. 1, i.e., in parallelism with the plane of FIG. 2.

The cycle control further includes two elongated cams 18, 19 which are detachably mounted on a supporting arm or carrier 20 affixed to and movable with the platen 2. The roller follower 17 is shiftable from engagement with the cam 18 into engagement with the cam 19, and vice versa, and each of these cams controls the delivery of the pump 8 while the platen 2 moves in one of the two directions with reference to the tie bars 1. In the illustrated embodiment, the cam 8 controls the delivery of the pump 8 during movement of the platen 2 from the left-hand toward the right-hand end position, and the cam 19 controls the delivery of pump 8 during return movement of the platen 2 to and beyond the position of FIG. 1. The roller follower 17 can track the faces of the cams 18, 19 by gravity or it may be biased against such faces by one or more springs, not shown. By changing the delivery of the pump 8, the cycle control regulates the speed of movement of the platen 2 and piston 4 in both directions, and such speed can be varied during forward movement as well as during return movement of the platen 2. The changes in speed will be determined by the configuration of faces on the cams 18 and 19.

The platen 2 is provided with a second supporting arm or carrier 21 for two longitudinally adjustable actuating members or strips 22, 23 which can respectively operate two limit switches 24, 25 mounted on the double-acting cylinder 12 or on the frame 7. The trips 22, 23 will respectively operate the switches 24, 25 when the platen 2 assumes its right-hand and left-hand end positions. The cylinder 12 further carries a small cylinder for a pressure responsive piston 26 which is exposed to pressure of oil in the left-hand chamber of the cylinder 12 and is biased by a helical spring 28 to resist movement in response to oil pressure. The piston 26 carries a further actuating member or trip 27 which can operate a switch 30 mounted on an extension 29 of the connecting rod 16.

The frame 7 supports a fixed electromagnet 31 whose armature is constituted by a post 16a of the connecting rod 16. When the electromagnet 31 is energized, it shifts the armature 16a upwardly and thereby displaces the connecting rod 16 to place the pump 8 into a "zero" delivery position in which the pump does not deliver any fluid through the conduit 9 or 10.

The shifting means for the roller follower 17 comprises two electromagnets 32, 33 which are mounted on the frame 7 and have a common armature 17a which is connected with the roller follower. When the electromagnet 32 is energized, it attracts the armature 17a and causes the roller follower 17 to move from the face of the cam 18 to the face of the cam 19. The roller follower 17 will reengage the face of the cam 18 in response to energization of the electro magnet 33. The arrangement is such that only one of these electromagnets can be energized at a time. The electromagnet 34 can shift the valve member of the distributor valve in one direction, and such valve member is permanently biased in the other direction by a suitable valve spring which is not shown in the drawings. The conductors of the electric circuit of the cycle control which includes the aforementioned trips, switches and electromagnets are not shown in FIGS. 1 and 2.

The operation is as follows:

FIG. 1 illustrates the platen 2 during movement from its left-hand end position toward the platen 3. The delivery of the pump 8 is controlled by the cam 18 which is tracked by the roller follower 17 of the motion transmitting linkage and the pump 8 forces oil into the conduit 9 so that such oil flows into the left-hand chamber of the cylinder 12. At the same time, the distributor valve 11 permits oil to escape from the right-hand chamber of the cylinder 12, via conduit 10 and back into the tank 8a. When the platen 2 moves its female mold section 2a into actual abutment with the male mold section 3a, the platen 3 begins to move in the same direction and displaces the heating cylinder 5 with reference to the ram 6. The plasticized mass is expelled from the cylinder chamber 5b into the cavity of the mold. If the nature of the plasticized material is such that it should remain strongly compressed in the mold cavity for a certain interval of time following completion of the injection stage, a portion of the face on the cam 18 will be configurated in such a way that the delivery of the pump 8 is reduced very strongly and the platens 2, 3 advance the cylinder 5 and ram 6 very slowly against the opposition of dished springs 6a.

When the platen 2 reaches its right-hand end position, the trip 22 actuates or operates the limit switch 24 which energizes the electromagnet 31. The latter attracts the armature 16a and lifts the connecting rod 16 so that the delivery of pump 8 is reduced to zero. The electrical connection between the switch 24 and electromagnet 31 may include a suitable relay which is not shown in the drawing. Shortly before the trip 22 reaches the limit switch 24, oil pressure in the left-hand chamber of the cylinder 12 rises sufficiently to overcome the resistance of the spring 28 and to displace the piston 26 and trip 27 in a direction to the left, as viewed in FIG. 1. Thus, and since the extension 29 is integral with or rigidly affixed to the connecting rod 16 which latter is lifted by electromagnet 31 when the platen 2 reaches its right-hand end position, the extension 29 lifts the switch 30 into the path of movement of the trip 27. The spring 28 is free to contract and to return the piston 26 to the normal position shown in FIG. 1 when the oil pressure in the left-hand chamber of the cylinder 12 decreases. Such reduction in oil pressure will be caused by placing of the pump 8 into "zero" delivery position on energization of the electromagnet 31. The switch 30 energizes the electromagnet 32 which attracts the armature 17a and shifts the roller follower 17 into engagement with the face of the cam 19. The switch 30 simultaneously opens the holding circuits of relays (not shown) for the electromagnets 31 and 34 so that the delivery of the pump 8 is then controlled by the cam 19 because the electromagnet 31 is deenergized and that the valve 11 connects the conduit 10 with the pressure side of the pump 8 while the conduit 9 communicates with the tank 8a. Such changeover in the condition of the valve 11 is brought about by the aforementioned valve spring which can shift the valve member in response to deenergization of the electromagnet 34.

The platens 2, 3, their mold sections 2a, 3a, the heating cylinder 5, and its feeding device 5a then start to move in a direction to the left at the speed determined by the configuration of that face on the cam 19 which is tracked by the roller follower 17. It is preferred to configurate the face of the cam 19 in which a way that the return movement begins slowly in order to provide sufficient time for cooling of the freshly molded article. The mold is opened when the aforementioned stop bolts arrest the platen 3, the mold section 3a and the heating cylinder 5. The latter automatically receives a fresh suply of granular material because the outlet of the feeding device 5a has moved beyond the left-hand end of the ram 6. The platen 2 continues to advance to the left, now at a higher speed (which is again determined by the configuration of the face on the cam 19). The shaped article is ejected from the female mold section 2a when the platen 2 assumes its left-hand end position. If desired, the ejection can take place gradually, depending on the shape of the article and on certain other factors. The speed of ejection is again controlled by the cam 19 which regulates the delivery of the pump 8.

The trip 23 engages the limit switch 25 when the platen 2 reaches its left-hand end position whereby the switch 25 energizes the electromagnet 34 of the valve 11 and the electromagnet 33. The electromagnet 33 attracts the armature 17a and shifts the roller follower 17 into engagement with the face of the cam 18. The relay in the electrical connection between the limit switch 25 and electromagnet 34 is not shown in the drawing. The valve 11 then connects the conduit 10 with the tank 8a and simultaneously connects the conduit 9 with the pressure side of the pump 8. The machine is ready to begin the next operating cycle which is carried out in the same way as described above. The electromagnet 34 remains energized until the trip 22 reaches the limit switch 24, i.e., until the trip 27 operates the switch 30.

Figure 3:
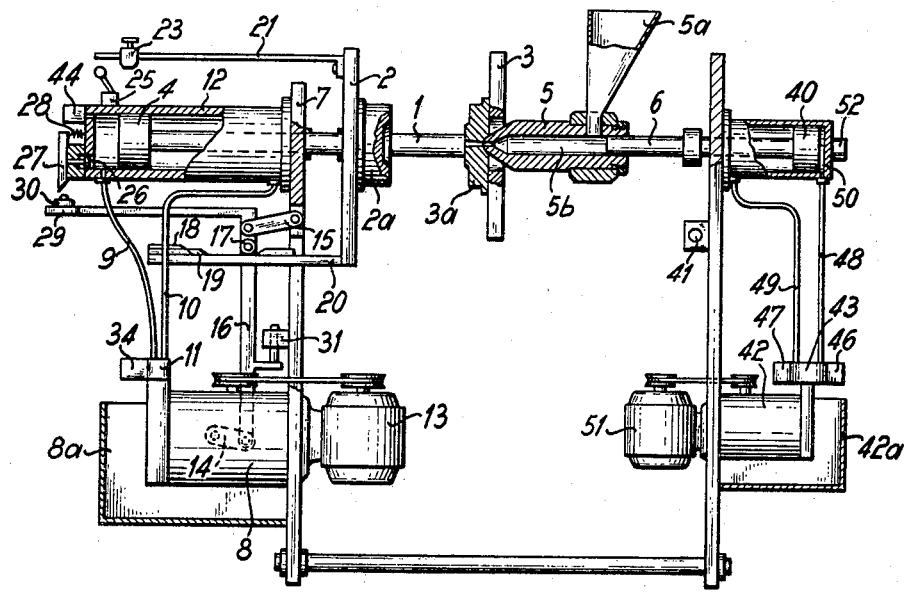
FIG. 3 is a schematic side elevational view of a second injection molding machine, with certain of its parts shown in section.
Figure 4:
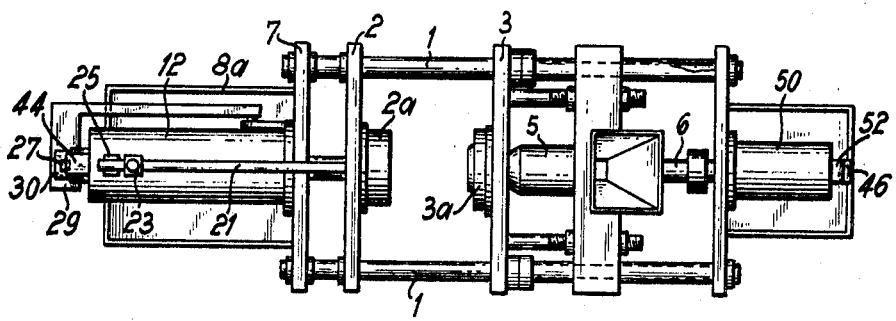
FIG. 4 is a top plan view of the second machine.

FIGS. 3 and 4 illustrate a modified injection molding machine. All such parts which are identical with or obviously analogous to the aforementioned parts of the machine of FIGS. 1 and 2 are denoted by similar reference numerals. An important difference between the two machines is that the ram 6 of the machine shown in FIGS. 3 and 4 is reciprocable by its own hydraulic reciprocating means including a double-acting cylinder 50 which is affixed to the frame 7 and a differential piston 40 whose piston rod is affixed to the ram 6. The piston 4 can shift the platen 2 along the tie bars 1 until the female mold section 2a engages the male mold section 3a. The platen 2 is then locked to the platen 3 in a manner which is known from the art and need not be shown here. The piston 40 is thereupon shifted in a direction to the left, as viewed in FIGS. 3 and 4, to displace to ram 6 with reference to the heating cylinder 5 and to inject plasticized material into the cavity of the closed mold. The piston 40 is then retracted to the position shown in FIG. 3 so that the chamber 5b, of the cylinder 5 can receive a fresh charge of material from the feeding device 5a. In the next step, the piston 4 retracts the platen 2 with the shaped article which latter remains in the female mold section 2a and is ejected by knockout pins mounted on the frame 7. If desired, the platen 3 can participate in the first portion of return movement of the platen 2 by being connected with the platen 2 by suitable springs. Stop bolts or the like (not shown) then arrest the platen 3 in the position shown in FIG. 3.

The cycle control for the hydraulic reciprocating means 4, 8, 9, 10, 12, 13 for the platen 2 is identical with the previously described cycle control, with the exception that the limit switch 24 is omitted, together with the trip 22. The hydraulic reciprocating means for the ram 6 comprises the aforementioned cylinder 50, the differential piston 40, two conduits 48, 49 which are respectively connected with the right-hand and left-hand chambers of the double-acting cylinder 50, a hydraulic variable delivery pump 42 which can draw oil from a tank 42a, and an electric motor 51 which drives the pump 42. A distributor valve 43 controls the flow of oil into and from the conduits 48, 49 and the operation of this valve is regulated by two electromagnets 46, 47. The pump 42 can be set to a zero delivery position. A pressure responsive switch 44 is connected with the cylinder 12 and responds to a predetermined pressure in the left-hand chamber of this cylinder. The switch 44 cooperates with a time delay unit 41 to insure project synchronization of the mold closing stage with the injection stage.

The operation of the machine shown in FIGS. 3 and 4 is as follows:

FIG. 3 illustrates the platen 2 in an intermediate position during movement from its left-hand end position toward the platen 3. The configuration of the cam 18 on the arm 20 of the platen 2 is such that the delivery of pump 8 is reduced shortly before the mold section 2a engages the mold section 3a. Once the mold is closed, the delivery of the pump 8 is changed in such a way that oil admitted into the left-hand chamber of the cylinder 12 via conduit 9 builds up a certain pressure which suffices to operate the switch 44. The switch 44 starts the time delay unit 41 which energizes the electromagnet 46 for a predetermined interval of time. The electromagnet 46 adjusts the distributor valve 43 to admit oil from the pressure side of the pump 42 via conduit 48 and into the right-hand chamber of the cylinder 50 so that such oil exerts pressure against the large right-hand end face of the differential piston 40. The piston 40 displaces the ram 6 and the latter injects plasticized material into the closed mold. The pump 42 remains in operation and is set in its zero delivery position in such a way that it builds up a certain locking pressure in the right-hand chamber of the cylinder 50 in order to prevent flashing of injected material. The locking pressure is preferably adjustable. When the time set by the time delay until 41 has elapsed, the electromagnet 46 is deenergized and the distributor valve 43 then admits oil via conduit 49 and into the left-hand chamber of the cylinder 50. Such oil exerts pressure against the smaller end face of the piston 40 and causes the ram 6 to return to the retracted position of FIG. 3 in which the chamber 5b of the heating cylinder 5 can receive a fresh supply of material from the feeding device 5a. Deenergization of electromagnet 46 results in automatic energization of the electromagnet 47 and electromagnet 31. A switch 52 is actuated by the piston 40 when the latter returns to its right-hand end position and the switch 52 then deenergizes the electromagnet 47. This enables the valve member of the distributor valve 43 to assume an intermediate position in which it causes the oil issuing from the pump 42 to flow back into the tank 42a.

Energization of the electromagnet 31 causes upward movement of the connecting rod 16 so that the pump 8 is set to zero delivery position. From then on, the remaining stages of the cycle proceed in the same way as described in connection with FIGS. 1 and 2, i.e., the roller follower 17 is moved into engagement with the face of the cam 19 and the valve 11 is set to deliver oil via conduit 10. Shifting of the roller follower 17 is initiated by the switch 30. The trip 23 will operate the limit switch 25 when the platen 2 returns to its left-hand end position. The cams 18, 19 will regulate the speed of forward and return movements of the platen 2, and such speed may be varied within a wide range. For example, the speed of return movement can be very high to reduce the overall time necessary for completion of a cycle. The same holds true for rapid forward movement of the female mold section 2a toward the male mold section 3a. Savings in time are considerable if the machine is large, i.e., if the platen 2 covers substantial distances during movement between the two end positions.

During the aforementioned participation of platen 3 in the initial portion of leftward movement of the platen 2, the cam 19 preferably causes the platens to move slowly so as to provide more time for satisfactory cooling of the freshly formed article.

It is clear that my injection molding machine is susceptible of many further modifications without departing from the spirit of the present invention. For example, the variable delivery pump 8 may be replaced by a pump wherein the delivery is varied from maximum to zero and thereupon increases from zero to maximum with simultaneous reversal in the direction of oil flow so that the valve 11 may be dispensed with. Such pumps are known in the art. The delivery of pump 8 is variable between zero and maximum delivery, and this pump is not of the type which automatically reverses the direction of oil flow from the conduit 9 to conduit 10 or vice versa.

Furthermore, the motion transmitting linkage which directly effects changes in the delivery of the pump 8 can be operated by hand, for example, by attaching a suitable handle or knob to one of the parts 14 to 16. This will enable the operator to regulate the delivery of the pump 8 independently of the novel cycle control, for example, to arrest the machine without any delay in the event of malfunction or jamming of a shaped article. Also, the manually operated member which can override the automatic cycle control is practical in preparing the machine for a different setup.

The machine is preferably furnished with two or more sets of cams 18, 19 so that the cycle control can be readily converted for a different type of operation. For example, a different set of cams 18, 19 will be installed if the mold sections 2a, 3a are replaced by a pair of different mold sections or if the device 5a is to feed a different type of starting material.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. An injection molding machine comprising guide means; a mold support mounted on said guide means movable in one and the opposite directions between a plurality of positions; hydraulic reciprocating means connected to said support for reciprocating the same in said one and said opposite directions and including variable delivery pump means; and cycle control means for regulating the delivery of said pump means in a first manner during movement of said support in said one direction and in a second manner during movement of said support in said opposite direction as a function of the position of said support.

2. A machine as defined in claim 1, wherein said hydraulic reciprocating means further comprises a double-acting cylinder member and a piston member slidably received in said cylinder member, one of said members being fixed and the other member being secured to said mold support, and conduit means for conveying hydraulic fluid from said pump means to said cylinder member to effect reciprocatory movements on said other member and said support.

3. A machine as defined in claim 2, wherein said mold support comprises a platen and said guide means comprises at least one tie bar reciprocably supporting said platen, said cycle control means comprising first and second cam means reciprocable with said platen, and motion transmitting means operatively connected with said pump means and including follower means for tracking one of said cam means during movement of said platen in one direction and for tracking the other cam means during movement of said platen in the other direction.

4. A machine as defined in claim 3, wherein said motion transmitting means further comprises a link train connecting said follower means with said pump means.

5. A machine as defined in claim 3, wherein said follower means comprises a single follower which is displaceable from engagement with said one into engagement with said other cam means, and vice versa, said cycle control means further comprising shifting means for displacing said follower.

6. A machine as defined in claim 5, wherein said platen is reciprocable between two end positions and said shifting means comprises a pair of electromagnet means each arranged to displace said follower into engagement with one of said cam means, and means for energizing said electromagnet means in response to movement of said support to its end positions.

7. A machine as defined in claim 2, wherein said pump means is movable to a zero delivery position and said mold support is movable between two end positions, said cycle control means including means for moving said pump means to zero delivery position in response to movement of said mold support to one of said end positions.

8. A machine as defined in claim 7, wherein said cycle control means further comprises means for effecting movement of said pump means from zero delivery position in response to movement of said mold support to the other end position.

9. A machine as defined in claim 8, wherein the means for effecting movement of said pump means from said zero delivery position is responsive to a predetermined fluid pressure in said cylinder member on movement of said mold support to the other end position.

10. A machine as defined in claim 7, wherein the means for moving said pump means to zero delivery position comprises electromagnet means and switch means operative to energize said electromagnet means in response to actuation by trip means arranged to move with said mold support.

11. A machine as defined in claim 2, further comprising a heating cylinder arranged to receive successive charges of thermoplastic material, an injection plunger reciprocable with reference to said injection cylinder to expel material from said heating cylinder, and second hydraulic reciprocating means for said injection plunger, said cycle control means including control means for operating said second reciprocating means in synchronism with operation of said first mentioned reciprocating means.

12. A machine as defined in claim 11, wherein said control means includes time delay means operative to effect penetration of said plunger into said injection cylinder with a given delay following movement of said mold support to a predetermined position.

13. A machine as defined in claim 12, wherein said control means further comprises means for starting said time delay means in response to a predetermined fluid pressure in said cylinder member.

14. A machine as defined in claim 1, further comprising a second mold support reciprocable along said guide means, said first mentioned mold support being movable between two end positions and said second mold support being arranged to share a portion of movement of said first mentioned mold support.

15. A machine as defined in claim 1, wherein said mold support is movable between two end positions and said cycle control means comprises a pair of cams each arranged to regulate the delivery of said pump means during movement of said mold support to one of said end positions, said cams being detachably mounted on said mold support.

16. A machine as defined in claim 2, wherein said piston member is a differential piston which is fixed to said mold support.

References Cited
UNITED STATES PATENTS

| | | |
|---|---|---|
| 2,318,031 | 5/1943 | Tucker. |
| 2,481,991 | 9/1949 | Ernst. |
| 2,358,353 | 9/1944 | Stack. |
| 2,381,125 | 8/1945 | Hermann. |
| 3,183,556 | 5/1965 | Studli. |

WILBUR L. McBAY, Primary Examiner

U.S. Cl. X.R.

164—343